Patented Sept. 8, 1953

2,651,644

UNITED STATES PATENT OFFICE 2,651,644

DEHYDROBICATECHOLS

Ole Gisvold, Minneapolis, Minn., assignor to Regents of the University of Minnesota, Minneapolis, Minn., a corporation of Minnesota No Drawing. Application June 3, 1949, Serial No. 97,093

7 Claims. (Cl. 260—398.5)

The present invention relates to some novel substituted dehydrobicatechols having the following structure:

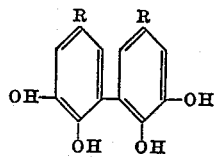

in which R is an aliphatic hydrocarbon group containing 1 to 3 carbon atoms.

These dehydrobicatechols are novel compounds and possess unusual properties both as antioxidants and as antiseptics.

It is, therefore, an object of the present invention to provide novel dehydrobicatechols having the above structural formula.

It is another object of the present invention to provide a novel process of producing such compounds.

These compounds may be prepared from known starting materials according to a variety of reactions. For example, the compound in which R is methyl may readily be prepared from vanillin as a starting material in accordance with the following series of reactions:

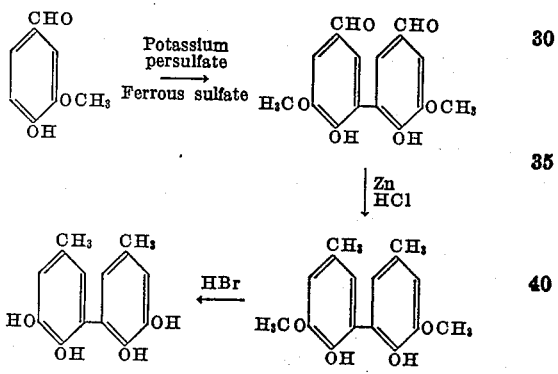

The compound in which R is a normal propyl group can readily be prepared from eugenol in accordance with the following series of reactions:

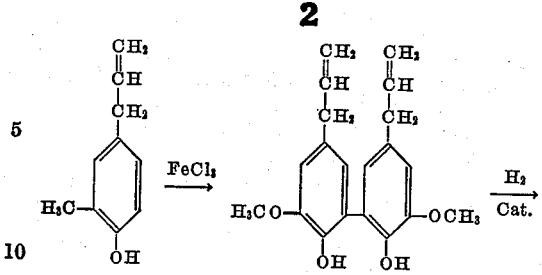

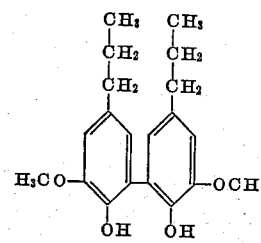

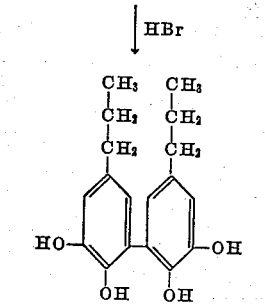

The compound in which R is an ethyl group is not as readily prepared from available starting materials but can be prepared from guaiacol in accordance with the following series of reactions:

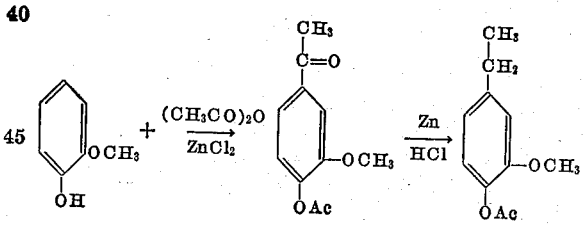

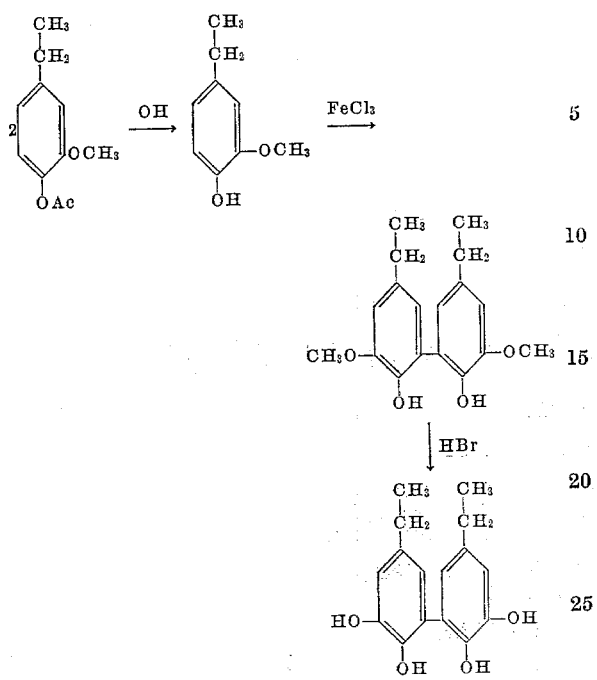

The methyl compound is preferred from a practical standpoint in view of the fact that it appears to exhibit the maximum properties from the antioxidant and antiseptic standpoints. Moreover, it may readily be prepared from starting materials which are available in large quantities and at a low cost. The n-propyl compound is also of considerable value and possesses antioxidant properties in a degree only slightly less than those of the corresponding methyl substituted compound. The antiseptic properties of the n-propyl substituted compound are also excellent, and this compound can likewise be prepared in good yields from materials available in large quantities. The reactions are somewhat less handy, however, in view of the limited solubility of eugenol in water and the necessity of working with dilute solutions and consequently with large volumes. The ethyl compound is less readily produced in view of the fact that there is no corresponding alkyl substituted guaiacol readily available at low cost. The ethyl substituted compound where R is ethyl can be produced readily and is desirable from the standpoint of its effectiveness.

EXAMPLE I 30 grams of vanillin were dissolved in two liters of water by heating on a steam bath and 0.5 gram of anhydrous ferrous sulfate and 30 grams of potassium persulfate were added with constant stirring. Dehydrodivanillin, together with some colored substances, separated immediately from the reaction mixture. After a few minutes the solid material was collected on a Büchner funnel and the precipitate was washed with a liter of boiling water. The washed product was suspended in three liters of boiling water and the product was dissolved by the addition of 5% sodium hydroxide solution. Five percent hydrochloric acid was added to this boiling solution to precipitate dehydrodivanillin. The precipitate was filtered and washed with 2 liters of boiling water. After repeating this purification process once more, a light grey product decomposing at 297–300° C. was obtained in about 82% yield.

Ten grams of dehydrodivanillin was boiled for ten minutes with 50 cc. of pyridine, and an equal volume of boiling acetic acid was then added. After cooling to about 50° C. the solid product was collected and washed with acetone and ether. This purification method was repeated once more. Nine grams of very light grey dehydrodivanillin decomposing at 301–303° C. was obtained.

Ten grams of dehydrodivanillin, 125 cc. of concentrated hydrochloric acid, 125 cc. of 95% alcohol, 25 grams of amalgamated zinc dust and 75 cc. of water were heated under the reflux for an hour. Then another 25 grams of amalgamated zinc dust was added, and the mixture was refluxed for an hour after solution was effected. The time required for solution varied, but it was usually complete in two hours. The mixture was filtered while hot to remove excess amalgamated zinc. Upon cooling a precipitate was obtained, which was collected by filtration. An additional precipitate resulted from the addition of water to the filtrate. About 9 grams of crude product having a melting range of 107–115° C. was obtained. This product was purified by fractional solution in dilute alcohol. The concentration of alcohol was held to a minimum so as to dissolve the least amount of oxidized reddish tarry material, which was then removed by filtration of the hot solution. The process was repeated several times. After the major portion of the tarry material had been removed by this process, the product was recrystallized from a higher concentration of alcohol, producing light pink crystals which melted at 127–129° C. An analytical sample was repeatedly crystallized from dilute alcohol until a white product was obtained. This product, dehydrodicresosol (2,2'-dihydroxy-3,3'-dimethoxy-5,5'-dimethyl biphenyl) had a melting point of 130–132° C. Analysis: Calculated for $C_{16}H_{18}O_4$: C, 70.06%; H, 6.61%; methoxyl, 22.62%. Found: C, 70.05; H, 6.91; methoxyl 22.47, 22.59.

Three grams of the above dehydrodicreosol, 15 cc. of glacial acetic acid and 15 cc. of 48% hydrobromic acid were refluxed for 4 hours. The mixture was allowed to cool, and the solvents removed by distilling at reduced pressure of a water pump. The residue was crystallized several times from dilute alcohol containing a small quantity of sodium hydrosulfite. The product, 2,2'-3,3'-tetrahydroxy-5,5'-dimethyl biphenyl, was a light pink crystalline product melting at 220–222° C. Analysis: Calculated for $C_{14}H_{14}O_4$; C, 68.28%; H, 5.73%. Found: C, 68,21; H, 6.02.

It will be noted that in this example the crude dehydrodivanillin was subjected to several purification steps to secure an end product of utmost purity to establish the identity of this intermediate. In actual practice, it is generally unnecessary to subject the crude dehydrodivanillin to any purification before reduction of the aldehyde groups.

EXAMPLE II

Six cc. of creosol were dissolved in 1000 cc. of distilled water in a 2-liter Florence flask and the solution chilled to 5° C. Ten cc. of ferric chloride solution (9 gram of $FeCl_3.6H_2O$ in 100 cc. of water) was added slowly with constant shaking, and the mixture was allowed to stand at room temperature for one week. The precipitated product was collected by filtration. Two crystallizations from dilute alcohol produced a white crystalline dehydrodicresosol melting at 130–132° C.

This product may be converted to 2,2',3,3'-tetrahydroxy-5,5'-dimethyl biphenyl in the same manner as in Example I.

EXAMPLE III

Twenty grams of eugenol were dissolved in 16 liters of distilled water and to it was added dropwise a ferric chloride solution (33 grams of $FeCl_3.6H_2O$ in 250 cc. of water) through a dropping funnel. The mixture was subjected to vigorous mechanical agitation. The ferric chloride addition required approximately 2 hours. The agitation was continued for 4 hours and a brown precipitate was obtained which was collected by filtration. The precipitate was dissolved in 100 cc. of ether and then treated with 5% sodium hydroxide solution until no further precipitation occurred. The entire mixture was heated on the steam bath to remove the ether. The resultant mixture was filtered and the precipitate washed with 5% sodum hydroxide solution until the color of the washings became light yellow. Approximately 1500 cc. of 5% sodium hydroxide solution was required. The free phenol was liberated from the sodium salt by boiling the salt in 200 cc. of 10% hydrochloric acid. The mixture was cooled, and the precipitate filtered and washed with water. The collected product was then dried and extracted in a Soxhlet extractor with petroleum ether (Skelly B). Dehydrodieugenol was only slightly soluble in petroleum ether, and upon prolonged extraction the dehydrodieugenol seprated from the petroleum ether in the flask. The solvent was decanted and a semi-pure product of slight yellow color was obtained. This product crystallized from about 75 cc. of 95% alcohol after partial decolorization with charcoal. This product melted at 101–103° C. Repeated recrystallization of an analytical sample raised the melting point to 105–106° C.

Hydrogenation of the side chains of dehydrodieugenol was readily accomplished by the use of hydrogen (at 30 pounds/sq. inch pressure) and platinum oxide as a catalyst. Four grams of dehydrodieugenol were dissolved in 350 cc. of 95% alcohol in a thick walled bottle, and to it was added 0.1 gram of platinum oxide. The reaction bottle was connected to a Parr hydrogenation apparatus. After the hydrogen pressure was built up to around 30 pounds/sq. inch the bottle was shaken for one hour at room temperature, although the hydrogenation appeared to be complete in 10 minutes. The hydrogenated product precipitated and the contents of the bottle were transferred to a beaker and heated to dissolve the reduced compound. The hot solution was filtered to remove the catalyst, and upon cooling tetrahydrodehydrodieugenol crystallized from the filtrate. Melting point 148–150°C.

Five grams of tetrahydrodehydrodieugenol, 25 cc. of glacial acetic acid, 5 cc. of acetic anhydride, and 25 cc. of 48% hydrobromic acid were refluxed for 2 hours. The reaction mixture was allowed to cool and was then poured into 250 cc. of water. The reaction flask was rinsed with water and the wash water combined with the main quantity of the reaction mixture. The precipitate that was collected by filtration was crystallized several times from dilute alcohol with the addition of a small amount of sodium hydrosulfite. The resultant 2,2'3,3'-tetrahydroxy-5,5'-di-n-propyl biphenyl melted at 149–150° C. Analysis: calculated for $C_{18}H_{22}O_4$: C, 71.50%; H, 7.34%. Found: C, 71.74%; H, 7.44%.

As was pointed out previously, the dehydrobicatechols of the present invention are excellent antioxidants. An antioxidant test was made on the samples according to the Swift stability test of King, Roschen and Irwin, Oil and Soap, 10, 105 (1933), using Stebnitz and Sommer's method, Oil and Soap, 12, 201 (1935) for determining the end of the induction period. Stebnitz and Sommer demonstrated that at the end of the induction period there is a rapid increase in volatile acids distilling over by bubbling air through lard. The exhaust tubes from the fat were connected to glass tubes extending into test tubes containing methyl red as indicator and 1 cc. of 0.01% sodium hydroxide.

Since the effect of different rates of air-flow on the values obtained for the stability test has been reported to show no detectable range in the rate of oxidation for a variation in the flow of air from 2.5 to 10 liters per hour except for erratic fluctuation over a range of about 5%, no attempt was made to control the air-flow to the 2.33 cc. per second set forth in the original Swift stability test. Approximately 1.5 cc. of air per second, determined by water displacement, was passed into each test tube. The temperature of the bath was maintained between 96–100° C. for the most part, but it occasionally fluctuated beyond these limits.

The keeping quality of the lard substrate was first determined and then was compared with the keeping quality of this substrate lard to which had been added 0.005% of the respective compounds. Three samples of each mixture were tested and the three values recorded for each compound are those obtained by starting the aeration of three samples at the same time and by recording the number of hours required for the indicator to turn red. As will be seen from the following table the alkyl substituted dehydrobicatechols showed excellent antioxidant activity on lard and on the weight for weight basis the activity of the alkyl substituted compounds decreased as the alkyl chain increased.

*Antioxidant test*

| Compound | Hrs. for Rancidity | Average | Protective Index |
|---|---|---|---|
| Control | 8.5 | 8.5 | |
| 2,2',3,3'-tectrahydroxy-5,5'-dimethyl biphenyl | 49.0 / 52.0 / 52.0 | 51.0 | 6.0 |
| 2,2',3,3'-tetrahydroxy-5,5'-di-n-propyl biphenyl | 33.0 / 35.0 / 36.0 | 35.0 | 4.1 |
| Nordihydroguaiaretic Acid | 35.0 / 36.0 / 38.0 | 36.0 | 4.2 |

These antioxidants are also found to be of unusual activity in vegetable oils and were also found to synchronize with acid synergists, such as citric acid. For this purpose various tests were made of 2,2',3,3'-tetrahydroxy-5,5'-dimethyl biphenyl in various concentrations in various substrates. This compound was tested alone and also with citric acid as a synergist at various levels. For purposes of comparison similar tests were made with nordihydroguaiaretic acid in the same substrates at the same concentrations and with the same synergist citric acid. The results are indicated in the following table. The data was obtained by the Swift rancidity test which was carried out in the manner described above.

1. Lard

[Control—3.5 hrs.]

|  | Hrs. |  | Hrs. |
|---|---|---|---|
| 0.001% A | 10 | 0.001% B | 8.5 |
| 0.001% A+0.005% CA | 19.5 | 0.001% B+0.005% CA | 18.5 |
| 0.002% A | 20 | 0.002% B | 16 |
| 0.002% A+0.01% CA | 33 | 0.002% B+0.01% CA | 31 |
| 0.005% A | 31 | 0.005% B | 26 |
| 0.005% A+0.025% CA | 53.5 | 0.005% B+0.025% CA | 45.5 |

2. Corn oil

[Control—13 hrs.]

|  | Hrs. |  | Hrs. |
|---|---|---|---|
| 0.005% CA | 19 |  |  |
| 0.005% A | 18 | 0.005% B | 13 |
| 0.005% A+0.005% CA | 31 | 0.005% B+0.005% CA | 23.5 |
| 0.01% A | 20 | 0.01% B | 13 |
| 0.01% A+0.005% CA | 35 | 0.01% B+0.005% CA | 26 |
| 0.02% A | 21.5 | 0.02% B | 15.5 |
| 0.02% A+0.01% CA | 40 | 0.02% B+0.01% CA | 32.5 |

3. Soybean oil

[Control—11 hrs.]

|  | Hrs. |  | Hrs. |
|---|---|---|---|
| 0.005% CA | 13.5 |  |  |
| 0.005% A | 14.5 | 0.005% B | 12.5 |
| 0.005% A+0.005% CA | 18 | 0.005% B+0.005% CA | 16.5 |
| 0.01% A | 16 | 0.01% B | 14.5 |
| 0.01% A+0.005% CA | 21 | 0.01% B+0.005% CA | 19 |
| 0.02% A | 19.5 | 0.02% B | 15.5 |
| 0.02% A+0.01% CA | 23 | 0.02% B+0.01% CA | 21.5 |

NOTE.—A equals 2, 2', 3, 3'-tetrahydroxy-5, 5'-dimethyl biphenyl. B equals nordihydroguaiaretic acid. CA equals citric acid.

This data shows that the present antioxidants are particularly effective in vegetable oils where known antioxidants are shown to be less effective than they are in animal fat substrates. Moreover, the present antioxidants are shown to synergize with known synergists and thus actually improve their activity in vegetable oils as well as in animal fat.

The above data is intended to be illustrative only and not as limiting the invention. The concentrations of antioxidant and synergists disclosed in these examples represent practical levels of antioxidant use. The stabilities reported in the data are of the order of magnitude desirable in commercial fatty products. It will be appreciated, however, that the invention is not limited to these particular concentrations. Thus, at levels as low as 0.001% substantial antioxidant activity is encountered. Where higher antioxidant levels are desired and where cost is a less significant factor, it is possible to employ these antioxidants in higher concentrations up to approximately 0.1% Usually it will not be necessary to use in excess of 0.1% of the antioxidants, inasmuch as at this level very high stabilities are obtained.

Similarly, while the examples have been with respect to vegetable and animal oils and fats, as such it is to be understood that the invention is in no manner limited thereto. The invention is applicable to such widely differing products as lard, lanolin, corn oil, fish liver oil and the like. It is also intended to include compositions in which these fatty materials are a constituent admixed with other materials, such as meats, fish, vegetable and meat products, cosmetics and the like. The term "fat" as used herein is intended to include both fats and oils, regardless of whether or not the product is solid or liquid at ordinary temperatures.

The presently claimed compounds also possess unusual antiseptic activity. The compounds were tested on *Streptococcus viridans* using a synthetic chemical medium consisting of amino acids, vitamins, sugars and salts. They were compared with phenol as a standard. The following table illustrates the results:

|  | No Growth | Growth |
|---|---|---|
| Phenol | 1:1,000 | 1:5,000 |
| 2,2',3,3'-tetrahydroxy-5,5'-dimethyl biphenyl | 1:1,280,000 |  |
| 2,2',3,3'-tetrahydroxy-5,5'-di-n-propyl biphenyl | 1:1,280,000 |  |

The compounds, therefore, are excellently adapted for combined use as antioxidants and antiseptics. They are particularly useful therefore in food products subject to oxidative rancidity and to bacterial putrefaction. They are excellently adapted for such products as ice cream mixes for this reason.

While various modifications of the invention have been described, it is to be understood that the invention is not limited thereto but that other modifications may be made without departing from the spirit thereof.

What I claim is:

1. A material normally subject to the deteriorating effects of oxidative rancidity containing a fractional percentage of a compound having the formula

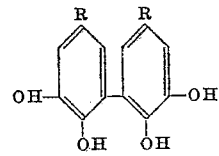

in which R is an aliphatic hydrocarbon group containing from 1 to 3 carbon atoms.

2. An oleaginous material normally subject to the deteriorating effects of oxidative rancidity containing a compound having the formula

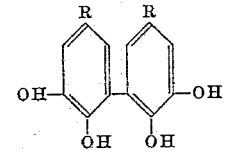

in which R is an aliphatic hydrocarbon group containing from 1 to 3 carbon atoms.

3. A fat normally subject to the deteriorating effects of oxidative rancidity containing a compound having the formula

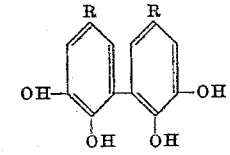

in which R is an aliphatic hydrocarbon group containing from 1 to 3 carbon atoms.

4. A material normally subject to the deteriorating effects of oxidative rancidity containing a fractional percentage of a compound having the formula

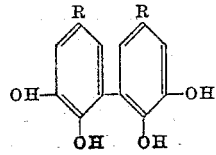

in which R is an aliphatic hydrocarbon group containing from 1 to 3 carbon atoms, the compound being employed in the approximate range of 0.001% to 0.1%, based on the weight of the material.

5. A material subject to bacterial infestation, said material containing a compound having the formula

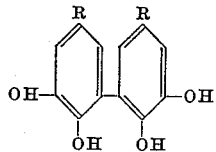

in which R is an aliphatic hydrocarbon group containing from 1 to 3 carbon atoms.

6. A material subject to bacterial infestation, said material containing a compound having the formula

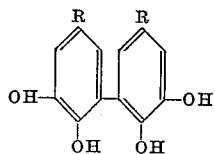

in which R is an aliphatic hydrocarbon group containing from 1 to 3 carbon atoms, the compound being employed in the approximate range of 0.001% to 0.1%, based on the weight of the material.

7. An aqueous-oleaginous material normally subject to oxidative rancidity and bacterial infestation, said material containing a compound having the formula

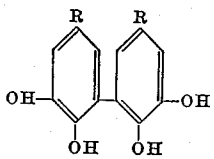

in which R is an aliphatic hydrocarbon group containing from 1 to 3 carbon atoms, said compound being employed in the approximate range of 0.001% to 0.1%, based on the weight of the material.

OLE GISVOLD.

References Cited in the file of this patent

UNITED STATES PATENTS

| Number | Name | Date |
|---|---|---|
| 1,993,771 | Calcott et al. | Mar. 12, 1935 |
| 2,074,993 | Sibley | Mar. 23, 1937 |
| 2,373,192 | Lauer | Apr. 10, 1945 |
| 2,455,256 | Jarowski | Nov. 30, 1948 |

OTHER REFERENCES

Beilstein (A), vol. VI, p. 1164 (1923).
Fichter et al.: Helv. Chim. Acta, vol. 8 (1925), pages 334–335.
Ono et al.: Chem. Abs., vol. 30, 5963 (1936).
Beilstein (B), vol. VI, 2nd supp., p. 1131 (1944).
Fieser and Fieser: "Organic Chemistry," page 639, pub. by D. C. Heath, New York (1944).